(12) United States Patent
Ritou et al.

(10) Patent No.: US 11,141,941 B2
(45) Date of Patent: Oct. 12, 2021

(54) DEVICE FOR MOULDING LENSES AND METHOD OF MANUFACTURING LENSES

(71) Applicant: Commissariat a l'energie atomique et aux energies alternatives, Paris (FR)

(72) Inventors: Arnaud Ritou, Grenoble (FR); Philippe Voarino, Nice (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 268 days.

(21) Appl. No.: 16/176,537

(22) Filed: Oct. 31, 2018

(65) Prior Publication Data

US 2019/0126577 A1    May 2, 2019

(30) Foreign Application Priority Data

Oct. 31, 2017    (FR) ...................................... 1760295

(51) Int. Cl.
*B29D 11/00*    (2006.01)
*B29C 33/00*    (2006.01)
(Continued)

(52) U.S. Cl.
CPC .... *B29D 11/00538* (2013.01); *B29C 33/0022* (2013.01); *B29C 33/0066* (2013.01);
(Continued)

(58) Field of Classification Search
CPC .......... B29D 11/00538; B29D 11/0048; B29D 11/00298; B29C 33/0066; B29C 33/0022; B29C 33/0077; B29C 41/02
See application file for complete search history.

(56) References Cited

U.S. PATENT DOCUMENTS 5,187,001 A * 2/1993 Brew ...................... B29B 7/748
                                                    425/145
6,210,610 B1   4/2001 Saito et al.
(Continued)

FOREIGN PATENT DOCUMENTS

EP    0 875 354 B1    10/2002
EP    1 759 824 B1     3/2016
FR    3 029 038 A1     5/2016

OTHER PUBLICATIONS

French Preliminary Search Report dated Jul. 2, 2018 in French Application 17 60295 filed on Oct. 31, 2017 (with English Translation of Categories of Cited Documents and Written Opinion).
(Continued)

*Primary Examiner* — Mathieu D Vargot
(74) *Attorney, Agent, or Firm* — Oblon, McClelland, Maier & Neustadt, L.L.P.

(57) ABSTRACT

A moulding device, for forming lenses by moulding, includes: a moulding element including indentations formed in a face of the moulding element; a transparent plate held with respect to the moulding element so as to form, with the indentations, a cavity intended to allow the formation of a plurality of lenses; at least one injection passage intended to allow moulding product to be introduced into the cavity, the injection passage being arranged between the transparent plate and the moulding element; a moulding product injector arranged so as to allow moulding product to be introduced into the injection passage. The injector is removable, and the moulding device is configured so as to allow the injector to be removed while at the same time keeping the transparent plate held with respect to the moulding element.

10 Claims, 6 Drawing Sheets

(51) Int. Cl.
  *B29C 41/02* (2006.01)
  *B29C 33/20* (2006.01)
(52) U.S. Cl.
  CPC .......... *B29C 33/0077* (2013.01); *B29C 41/02* (2013.01); *B29D 11/0048* (2013.01); *B29D 11/00298* (2013.01); *B29C 33/202* (2013.01); *B29C 2033/0005* (2013.01); *B29K 2995/0026* (2013.01)

(56) References Cited

U.S. PATENT DOCUMENTS

| | | |
|---|---|---|
| 6,625,379 B1 | 9/2003 | Azuma |
| 7,919,020 B2 | 4/2011 | Hamanaka et al. |
| 7,991,257 B1 | 8/2011 | Coleman |
| 9,435,934 B2 | 9/2016 | Morgan et al. |
| 9,464,782 B2 | 10/2016 | Morgan et al. |
| 2004/0119204 A1 | 6/2004 | Nishigaki |
| 2008/0144324 A1 | 6/2008 | Tahara et al. |
| 2011/0286222 A1 | 11/2011 | Coleman |
| 2014/0261625 A1 | 9/2014 | Morgan et al. |
| 2014/0261683 A1 | 9/2014 | Morgan et al. |
| 2014/0268761 A1 | 9/2014 | Raleigh et al. |
| 2016/0153639 A9 | 6/2016 | Raleigh et al. |
| 2017/0324369 A1 | 11/2017 | Dominguez |

OTHER PUBLICATIONS

Ritou, A. et al. "Micro-concentrator with a self-assembly process," AIP Conference Proceedings 1766, 080005, doi: 10.1063/1.4962103, 2016, pp. 7.

\* cited by examiner

DEVICE FOR MOULDING LENSES AND METHOD OF MANUFACTURING LENSES

FIELD OF THE INVENTION

The field of the invention relates to the moulding of lenses, particularly lenses of a nonimaging optic for optoelectronic components such as photovoltaic cells or light emitting diodes.

PRIOR ART

French patent application FR3029038 describes a method of manufacturing a photovoltaic concentrator with an optical structure equipped with a double stage of lenses using a mould to form a moulded component comprising lenses connected, which is to say fixed, to a transparent plate. This moulded component is obtained by injecting a moulding product into a cavity of the mould. This moulding product is then solidified resulting in the formation of a moulded component made of moulding product in the cavity, and the presence of a runner in a passage that has allowed the moulding product to be injected into the cavity of the mould. One disadvantage of the solution described in that French patent application FR3029038 is that it may exhibit a risk of damage to the connection between the moulded component, that forms the lenses, and the transparent plate during demoulding of the moulded component. The damage to the connection between the transparent plate and the moulded component has the disadvantage of reducing the efficiency of the optical concentrator. Furthermore, this damage to the connection between the transparent plate and the moulded component may deform the lenses and therefore harm the operation thereof.

The document "Micro-Concentrator with a Self-Assembly Process" by A. Ritou et al., published in AIP Conference Proceedings 1766, 080005-1-080005-6 (2016) and from the "12th International Conference on Concentrator Photovoltaic Systems (CPV-12)" describes a method of manufacturing a double stage of lenses and the assembly of an optical concentration photovoltaic module from the double stage of lenses formed. One of the stages of lenses remains connected, which is to say fixed, to a transparent plate that was used in moulding a component that forms the said lens stage. The method of manufacture described in that document also has the disadvantage of a risk of harm to the connection between the transparent plate and the lens stage fixed to the transparent plate during the demoulding of the lens stage.

It will be appreciated from what has been described hereinabove that there is a need to find a solution that makes it possible to avoid damage to the connection between a moulded component and a transparent plate during the demoulding of the moulded component.

OBJECT OF THE INVENTION

The aim of the invention is to improve the demoulding of a moulded component forming a plurality of lenses. This moulded component needs to remain fixed, which is to say connected, to a transparent plate which has participated in the moulding of the said component. Notably, the invention seeks to avoid damage to the connection between the moulded component and the transparent plate during the demoulding of the moulded component.

To that end, one subject of the invention is a moulding device for forming lenses by moulding, the said moulding device comprising:

- a moulding element comprising indentations formed in a face of the moulding element,
- a transparent plate held with respect to the moulding element so as to form, with the indentations, a cavity intended to allow the formation of a plurality of lenses,
- at least one injection passage intended to allow moulding product to be introduced into the cavity, the injection passage being arranged between the transparent plate and the moulding element,
- a moulding-product injector arranged so as to allow moulding product to be introduced into the injection passage, this moulding device is characterized in that the injector is removable, and in that the said moulding device is configured so as to allow the injector to be removed while at the same time keeping the transparent plate held with respect to the moulding element.

Such a moulding device offers the advantage of allowing the injector to be removed before the component moulded in the cavity is demoulded, so as to allow breakage of at least one injection-moulding runner, referred to as "runner", the presence of which is the result of the injection of moulding product into the cavity. The arrangement of the components of the moulding device allows the runner to be broken before the moulded component is demoulded from the moulding element, so as to preserve the connection between the transparent plate and the moulded component.

The moulding device may comprise one or more of the following features:

- the moulding device comprises an assembly member fixing the position of the transparent plate with respect to the moulding element;
- the assembly member urges the transparent plate towards a discontinuous peripheral bearing surface of the face of the moulding element in which the indentations are formed;
- the assembly member comprises:
  - at least one first fixing member,
  - at least one second fixing member,
  - two frames between which the transparent plate is arranged, the said frames being assembled with one another by the said at least one first fixing member so as to clamp the transparent plate, and the assembly of the two frames clamping the transparent plate being mounted to the moulding element by the said at least one second fixing member;
- the moulding device comprises at least one first fixing element that holds the injector with respect to the moulding element, and at least one second fixing element configured to hold the injector with respect to the transparent plate;
- the first fixing element is a screw passing through the injector and screwed into the moulding element, and the second fixing element is a screw passing through the frames and screwed into the injector;
- the moulding device comprises a plurality of injection passages each forming an injection channel connecting the cavity to the injector;
- the injector comprises:
  - a groove closed at its longitudinal ends, and
  - notches, each notch being arranged so as to place the groove in fluidic communication with one of the injection passages;
- the groove and the notches cooperate with the transparent plate to form a closed-section hollow injection body;
- the transparent plate and the moulding element form a setback where the injector is arranged;

the moulding device is such that:
- the indentations are intended to participate in the formation of first lenses of a nonimaging optic, and the face of the moulding element in which the indentations are formed is a first face of the moulding element,
- the moulding element comprises a second face opposite to its first face,
- the moulding element comprises hollows formed in its second face, the hollows being intended to participate in the formation of second lenses of the nonimaging optic,
- the said moulding device comprises a substrate on which optoelectronic components are connected, the said substrate being mounted to the moulding element so that each optoelectronic component is associated with one of the hollows;
- the transparent plate comprises an adhesion primer configured to allow a solidified moulding product present in the cavity to adhere to the said transparent plate.

The invention also relates to a method of manufacturing lenses, the said method of manufacture comprising the following steps:
- a step of supplying a moulding device for forming lenses by moulding, the said moulding device comprising:
  - a moulding element comprising indentations formed in a face of the moulding element,
  - a transparent plate held with respect to the moulding element so as to form, with the indentations, a cavity intended to allow the formation of a plurality of lenses,
  - at least one injection passage intended to allow moulding product to be introduced into the cavity, the injection passage being arranged between the transparent plate and the moulding element,
  - a moulding-product injector arranged so as to allow moulding product to be introduced into the injection passage,
- a step of injecting a moulding product with the aid of the injector, which results in the presence of moulding product in the injector, in the injection passage, and in the cavity,
- a step of solidifying the moulding product present in the cavity, in the injection passage and in the injector, the solidified moulding product present in the cavity forming a moulded component comprising the plurality of lenses, the moulded component being fixed to the transparent plate, the solidified moulding product present in the injection passage and in the injector forming an element made of solidified moulding product which is connected to the moulded component,
- a step of removing the injector, which step is implemented after the solidification step, the removal step being performed while the transparent plate is still held with respect to the moulding element, and the step of removing the injector causing the element made of solidified moulding product to break.

The method of manufacture may comprise one or more of the following features:
- the step of removing the injector comprises a step of moving the injector in an opposite direction to the moulding element, and a step of angling the injector with respect to that face of the transparent plate that is oriented toward the moulding element;
- the method of manufacture comprises, after the step of removing the injector, a step of demoulding the moulded component by moving the transparent plate away from the moulding element.

BRIEF DESCRIPTION OF THE DRAWINGS

Further features and advantages will become clearly apparent from the detailed description which will follow of particular embodiments of the invention given by way of nonlimiting examples and depicted in the attached drawings in which.

In these figures, the same references are used to denote the same elements.

Figure 1:
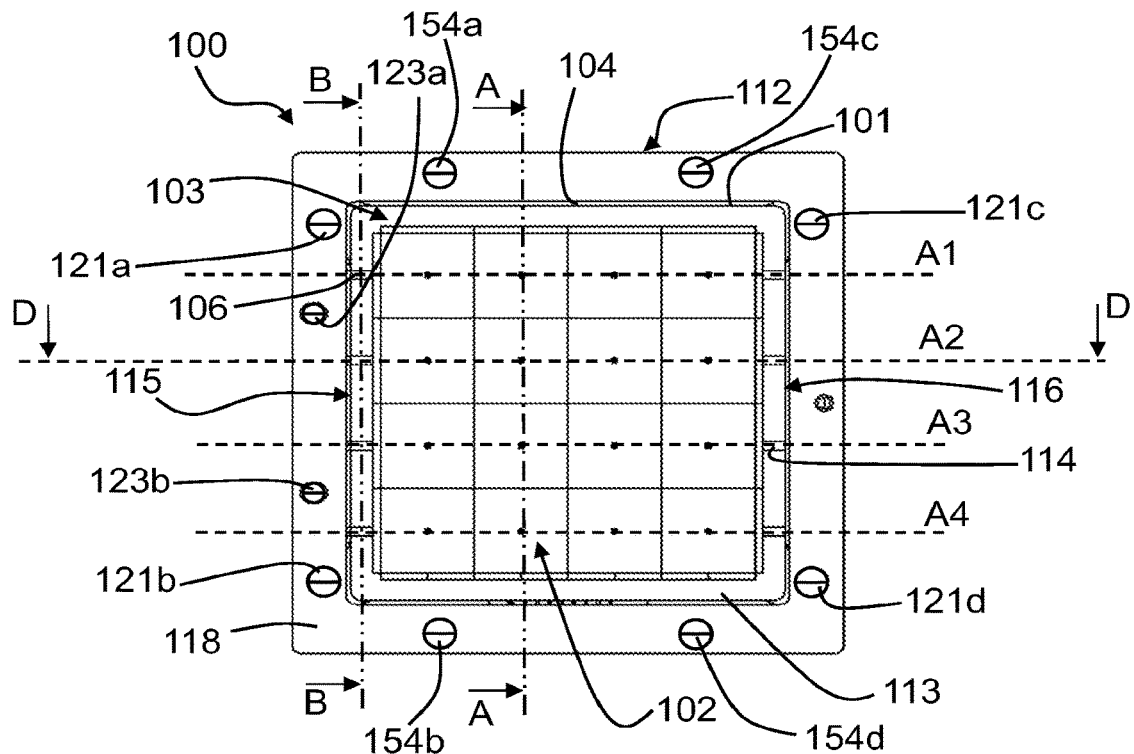
FIG. 1 depicts a view from above of a moulding device for forming lenses by moulding according to a particular embodiment of the invention.

Furthermore, in order to make the figures easier to study, the elements depicted in the figures are not necessarily drawn to scale.

DETAILED DESCRIPTION

A moulded component of the type that needs to remain connected, which is to say fixed, to a transparent plate that has participated in moulding the moulded component in a corresponding cavity is described hereinafter. In fact, a more in-depth study of the solutions described in patent application FR3029038 and in the document "Micro-Concentrator with a Self-Assembly Process" by A. Ritou et al., published in AIP Conference Proceedings 1766, 080005-1-080005-6

(2016) and from the "12th International Conference on Concentrator Photovoltaic Systems (CPV-12)" has made it possible to identify that the damage to the connection between the moulded component and the transparent plate caused by the tearing of at least one runner during the demoulding of the moulded component. Notably, the runner is formed in a passage that allowed the moulding product to be injected into a corresponding cavity in order to form the moulded component. What happens during demoulding of the moulded component is that the tearing of the runner may generate stresses that damage the connection between the moulded component and the transparent plate, it being possible for this damage subsequently to cause degradation of the optical quality of the lenses of the moulded component. In that sense, the tearing corresponds to an uncontrolled breakage of the runner leading to the abovementioned damage to the connection.

A moulding device for forming lenses by moulding is described hereinafter. Such a moulding device comprises components designed to facilitate the demoulding of the moulded component comprising a plurality of lenses. This plurality of lenses is therefore formed by moulding in the corresponding cavity. In particular, the moulding device proposes a particular arrangement of a moulding-product injector that allows this injector to be removed while at the same time allowing the moulded component to remain held in the cavity used for moulding it. That notably allows controlled breakage of the runner so as to maintain a quality connection between the transparent plate and the moulded component after demoulding of the moulded component.

In the present description, the moulding product is a product initially in liquid form and the viscosity of which allows it to flow so as to fill the cavity in order to form the moulded component through solidification of the moulding product present in the cavity. The moulding product may be a silicone or another polymer suited to the function of forming lenses by moulding.

What is meant by "based on" is "predominantly comprising".

What is meant by "substantially parallel" is exactly parallel, or parallel to within a tolerance of plus or minus 10 degrees.

What is meant by a lens is an optical lens, which notably means an optical system capable of deflecting light rays and at least one of the faces of which may be concave or convex.

Figure 2:
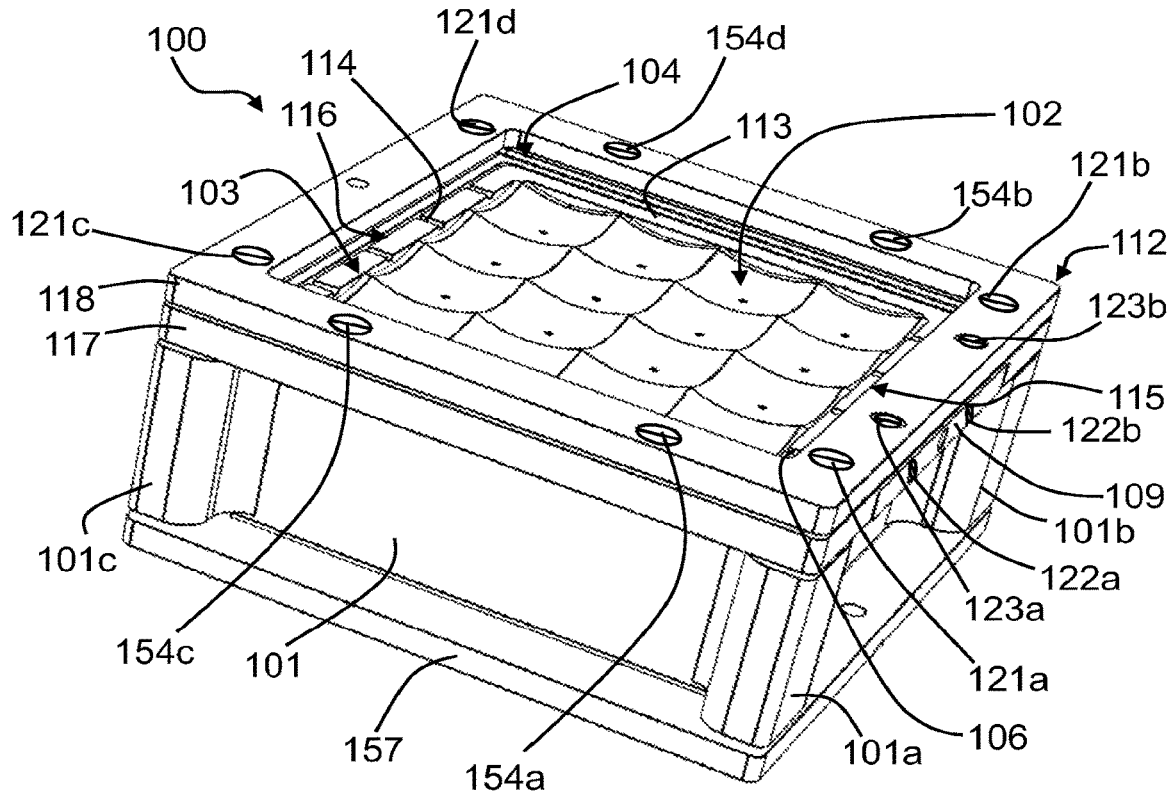
FIG. 2 depicts a perspective view of FIG. 1.
Figure 3:
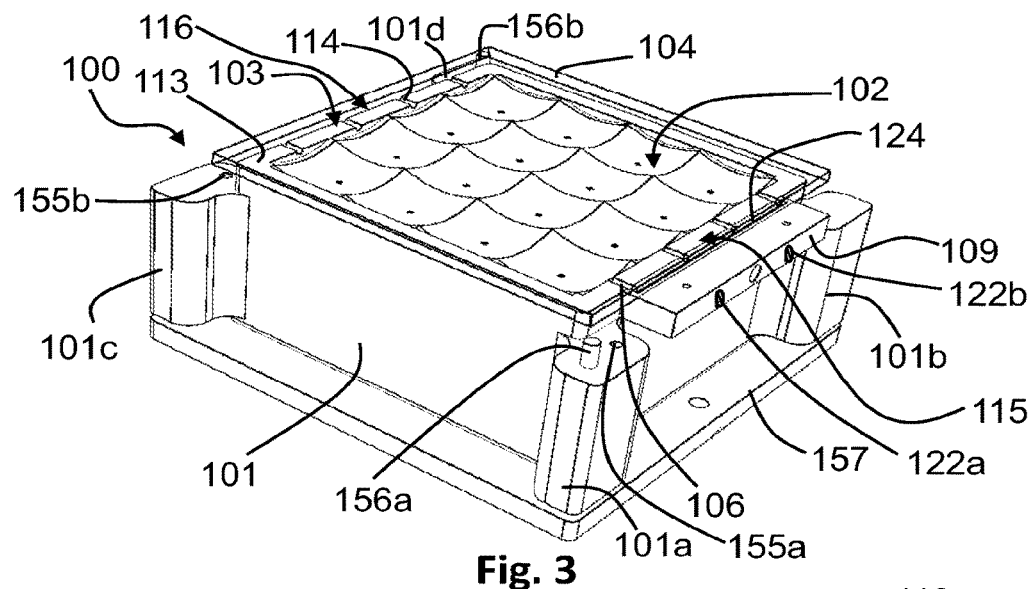
FIG. 3 depicts the perspective view of FIG. 2 in which frames have been removed.
Figure 4:
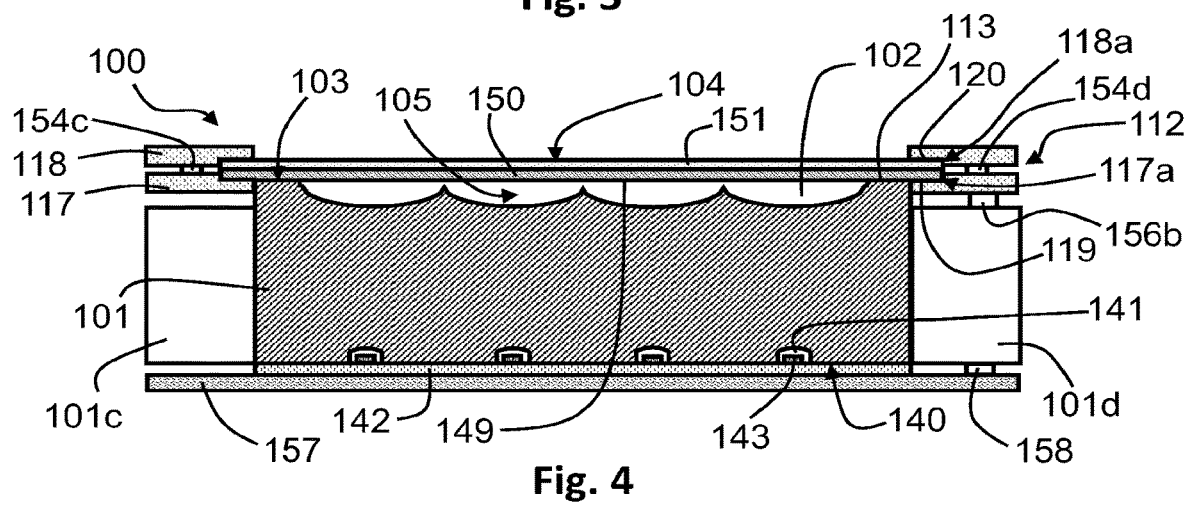
FIG. 4 schematically depicts a view in cross section along A-A of the moulding device of FIG. 1.
Figure 5:
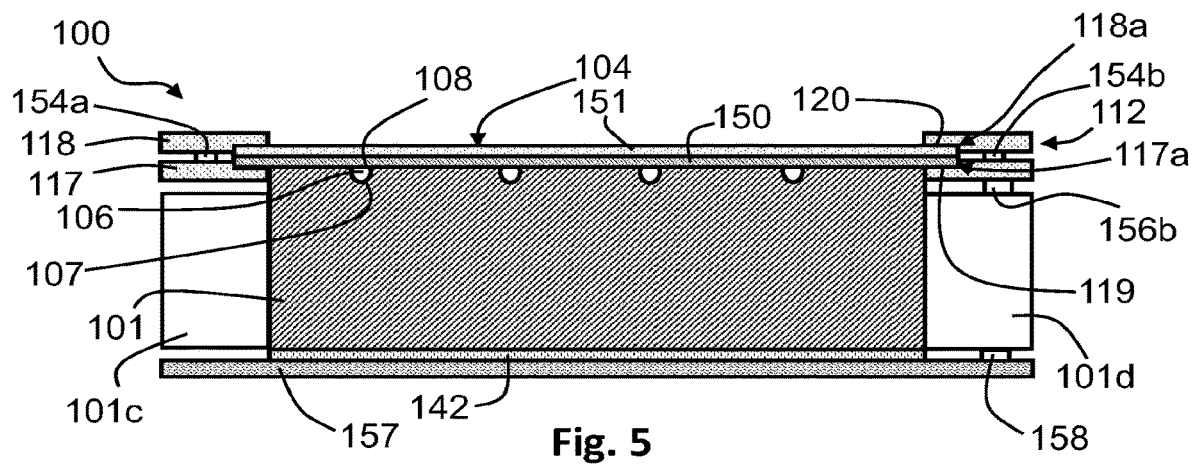
FIG. 5 schematically depicts a view in cross section along B-B of the moulding device of FIG. 1.

As illustrated by way of example in FIGS. 1 to 4, the moulding device 100 comprises a moulding element 101. This moulding element 101 comprises indentations 102 formed in a face 103 of the moulding element 101. Each indentation 102 is intended to participate in the formation of a corresponding lens. In the example of FIGS. 1 to 3, sixteen indentations 102 are depicted. This number of indentations 102 is nonlimiting and can be adapted to suit the requirements. The indentations 102 are preferably arranged in an array of several rows of indentations 102 each extending along a corresponding axis A1, A2, A3, A4 (depicted in dotted line in FIG. 1). The indentations 102 are shaped to the desired shapes of the lenses.

The moulding device 100 further comprises the transparent plate 104 (FIGS. 1 to 4) which is held with respect to the moulding element 101 so as to form, with the indentations 102, the cavity 105 (FIG. 4) intended to allow the formation of the plurality of lenses. The transparent plate 104 is said to be "held with respect to the moulding element 101" because, within the moulding device 100, it remains in a fixed position relative to the moulding element 101 to form the cavity 105. Notably, the transparent plate 104 and the moulding element 101 are urged toward one another with the purpose of making it possible to keep the transparent plate 104 held with respect to the moulding element 101 while at the same time providing the cavity 105 with a suitable sealing so that it can be filled with moulding product. Preferably, the transparent plate 104 is in direct contact with the moulding element 101, notably if the materials of the transparent plate 104 and of the moulding element 101 are able to provide the desired sealing, this for example being the case if the transparent plate 104 is made of glass, or based on glass, and if the moulding element 101 is made of aluminium. Alternatively (not depicted in the figures) a seal may be interposed between the transparent plate 104 and the moulding element 101, the seal then being compressed between the transparent plate 104 and the moulding element 101. In general, the transparent plate 104 is notably held so that the cavity 105 formed allows each indentation 102 to be in fluidic communication with at least one other adjacent indentation, the purpose of this being to allow the cavity 105 to be filled easily when moulding product is injected into the cavity 105. The cavity 105 has a volume intended to be filled with moulding product in order to form the moulded component in the cavity 105.

The moulding device 100 further comprises (FIGS. 1 to 3 and 5) at least one injection passage 106 intended to allow moulding product to be introduced into the cavity 105. This injection passage 106 is arranged, which is to say formed, between the transparent plate 104 and the moulding element 101, the advantage of this being to favour demoulding of the moulded component from the moulding element 101 while at the same time allowing the moulding element 101 easily to be reused by avoiding any solidified moulding product remaining trapped in the moulding element 101. For preference, this injection passage 106 is delimited by the transparent plate 104 and the moulding element 101, this making it possible to simplify the structure of the moulding device 100. This delimitation of the injection passage 106 also makes it possible, as described hereinafter, to form the runner that adheres to the transparent plate 104 and the breakage of which can be controlled. The injection passage 106 may (FIG. 5), particularly in part, be delimited by a cut 107 formed in the moulding element 101, and by a portion 108 of the transparent plate 104. In other words, the injection passage 106 may be delimited by a surface a portion of which comes from the transparent plate 104 and another portion of which is formed by the cut 107. If appropriate, the injection passage 106 may also be delimited in part by the seal described above. As illustrated in FIGS. 1, 2, 3 and 5, the moulding device 100 may comprise a plurality of injection passages 106, for example four of them, the purpose of these being to favour homogeneous distribution of moulding product within the cavity 105. For example, the moulding device 100 comprises as many injection passages 106 as the moulding element 101 has rows of indentations 102, and each injection passage 106 opens into the cavity 105 at a corresponding end of one of the rows of indentations 102. As a result, anything that applies to one injection passage 106 may apply to each of the injection passages 106 when the moulding device 100 comprises several of these. Notably, the, or each, injection passage 106 forms an injection channel.

As illustrated in FIGS. 2 and 3, the moulding device 100 comprises the moulding-product injector 109. This injector 109 is arranged so as to allow moulding product to be introduced into the injection passage 106, the purpose of this introduction being to fill the cavity 105 with moulding product. Within the context of the moulding device 100, the injector 109 is removable and the moulding device 100 is configured so as to allow the injector 109 to be removed while at the same time keeping the transparent plate 104 held with respect to the moulding element 101. In the present description, removal of the injector 109 corresponds to its removal with respect to the moulding device 100, notably with respect to its positioning within the moulding device 100 with respect to the moulding element 101 and the transparent plate 104. Thus, worded differently, the moulding device 100 is able to adopt first and second configurations. In the first configuration, the moulding device 100 comprises the injector 109, and in the second configuration, the moulding device 100 is not provided with an injector 109. As a result, in the first and second configurations, and during the transition from the first configuration to the second configuration (and vice versa), the relative positions of the transparent plate 104 and the moulding element 101 remain the same. For preference, the injector 109 and the moulding element 101 are urged towards one another, and the transparent plate 104 and the injector 109 are urged towards one another: this urging notably makes it possible to seal an assembly of the injector 109 to the moulding element 101, and an assembly of the injector 109 to the transparent plate 104, this sealing being suited to the introduction of moulding product into the injection passage 106 by the injector 109. Worded differently, the injector 109 is clamped both against the moulding element 101 and against the transparent plate 104. In particular, the injector 109 is in direct contact with the transparent plate 104 and with the moulding element 101, the sealing (between the injector 109, the moulding element 101 and the transparent plate 104) is therefore satisfactory notably if the injector 109 and the moulding element 101 are made from aluminium and if the transparent plate is made from glass or based on glass. Alternatively, a seal (not depicted in the figures) is interposed between the transparent plate 104 and the injector 109, and/or a seal (not depicted in the figures) is interposed between the injector 109 and the moulding element 101. When the moulding device 100 comprises a plurality of injection passages 106, these each form an injection channel connecting the cavity 105 to the injector 109 to ensure better distribution of moulding product in the cavity 105.

Figure 6:
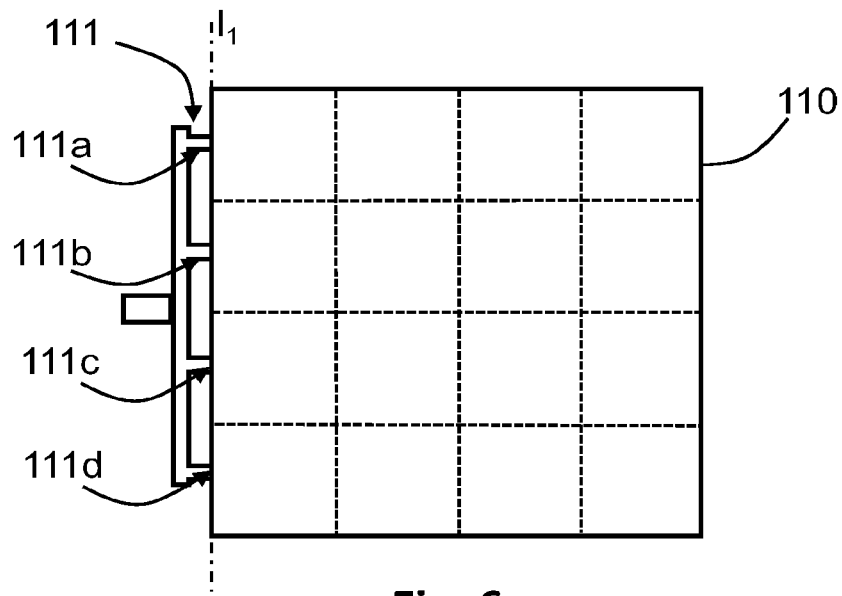
FIG. 6 illustrates a particular embodiment of a moulded component connected to an element made of solidified moulding product coming from a moulding-product injection pathway upstream, according to the direction of flow of the moulding product within the moulding device, of a cavity that has allowed the moulded component to be formed.

In general, the fact that the injector 109 can be removed without detriment to the relative positioning of the transparent plate 104 with respect to the moulding element 101 offers an advantage regarding the integrity of the moulded component, particularly the integrity of the connection between the moulded component and the transparent plate 104 which have to remain fixed to one another during the demoulding of the moulded component from the moulding element 101, and after the demoulding of the moulded component from the moulding element 101. What happens is that the moulding of the plurality of lenses using the moulding device 100 as described can be performed by the injection of a moulding product by the injector 109 (the injector 109 then fills with moulding product) which allows moulding product to be introduced into the injection passage 106 which subsequently results in the filling of the cavity 105 with moulding product. Once the cavity 105 is full of moulding product, the moulding product is solidified, for example by cross-linking if the moulding product is silicone (or based on silicone) to form the moulded component comprising the plurality of lenses fixed to the transparent plate 104. Worded differently, at the end of the solidification of the moulding product in the cavity 105, the moulded component is fixed to the transparent plate 104. FIG. 6 schematically illustrates the moulded component 110 in the form it exhibits, prior to its demoulding, in the moulding device 100 as illustrated in FIGS. 1 to 4. The dotted lines contained within the moulded component 110 indicate the boundaries of the lenses of the plurality of lenses. Solidification of the moulding product present in the moulding device 100 results in the obtaining of an element 111 made of solidified moulding product which is connected to the moulded component 110. In FIG. 6, the material represented as an extension of the moulded component 110, to the left of the line $I_1$, corresponds to some solidified moulding product the shape of which is imparted by a path of distribution of the moulding product within the injector 109 and by the injection passage or passages 106. The element 111 made of solidified moulding product may comprise one or more runners 111a, 111b, 111c, 111d. The runner or runners each comprise a part situated in the corresponding injection passage 106, and another part situated in the injector 109. Advantageously, because (when the moulding product is solidified in the moulding device 100) the removal of the injector 109 is achieved without detriment to the relative position between the transparent plate 104 and the moulding element 101, the element 111 made of solidified moulding product breaks, and notably one or more runners 111a, 111b, 111c, 111d of the element 111 made of solidified moulding product break(s). When the injection passage 106 is delimited by the moulding element 101 and the transparent plate 104, that allows the runner that will be formed therein to adhere to the transparent plate 104, with the result that removal of the injector 109 allows controlled breakage of the runner at the junction between the injector 109, the moulding element 101, and notably the transparent plate 104: that makes it possible to avoid subsequent tearing of the lenses of the moulded component 110 with respect to the transparent plate 104. This breakage of the element 111 made of solidified moulding product is performed while at the same time avoiding/limiting the generation of stresses between the moulded component 110 and the transparent plate 104 which would have resulted in damage to the connection fixing the transparent plate 104 to the moulded component 110. In other words, this breakage of the element 111 made of solidified moulding product is performed, when the injector 109 is being removed, while the moulded component 110 is still in the cavity 105 and while the transparent plate 104 is still held with respect to the moulding element 101. In this way, the breakage of the element 111 made of solidified moulding product notably occurs at the point at which the injector 109 communicates with the injection passage 106.

Figure 7:
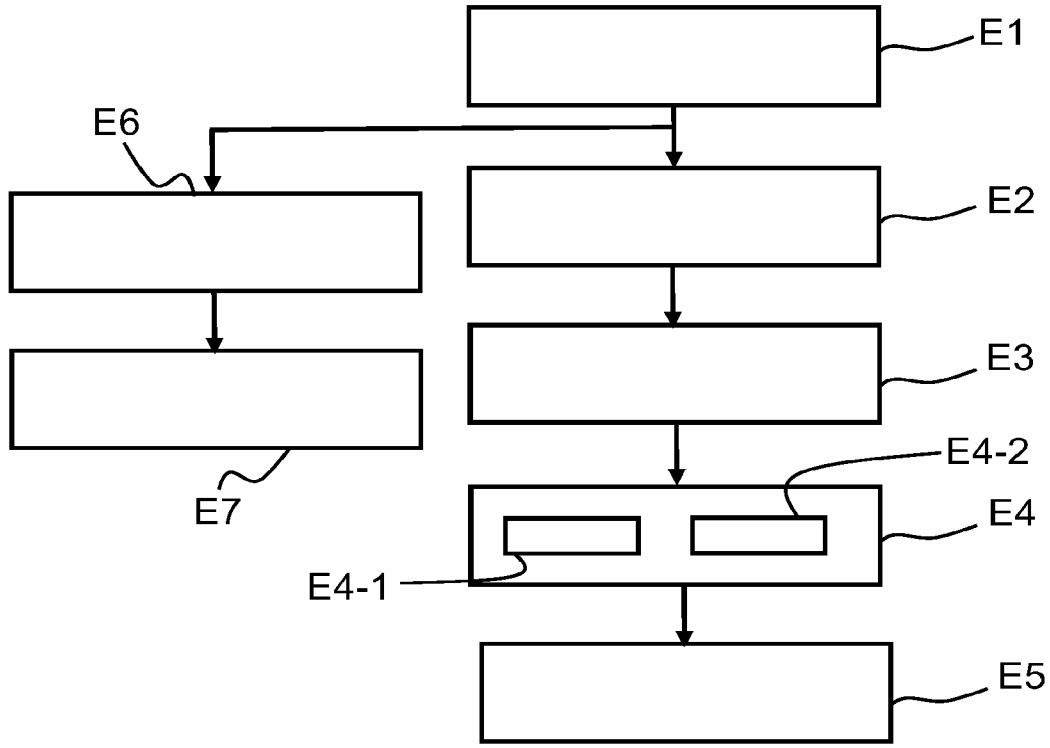
FIG. 7 schematically illustrates steps in a method of manufacturing lenses according to a particular embodiment of the invention.

It will be appreciated from the foregoing that the invention also relates to a method of manufacturing lenses as illustrated schematically in FIG. 7. The method of manufacture comprises a step E1 of supplying the moulding device 100, for example as described. Notably, the supplying step E1 is such that the moulding device 100 supplied comprises: the moulding element 101 comprising the indentations 102 formed in the face 103 of the moulding element 101; the transparent plate 104 held with respect to the moulding element 101 so as to form, with the indentations 102, the cavity 105 intended to allow the formation of the plurality of lenses; the said at least one injection passage 106 intended to allow the introduction of moulding product into the cavity 105, the injection passage 106 being arranged, which is to say formed, between the transparent plate 104 and the moulding element 101; the injector 109 of moulding product arranged so as to allow moulding product to be introduced into the injection passage 106 for the purposes of filling the cavity 105 with moulding product. The method of manufacture further comprises a step E2 of injecting a moulding product with the aid of the injector 109 (which is to say using the injector 109) which results in the presence of moulding product in the injector 109, in the injection passage 106, and in the cavity 105. Thus, when the cavity 105 is filled with moulding product, moulding product is also present in the injector 109 and in the injection passage 106. Injection using the injector 109 is notably such that the injection step E2 is implemented via the injector 109 which distributes the moulding product within the cavity 105. The injector 109 may notably be connected to a reserve of moulding product via a moulding-product dispenser (not depicted) which dispatches the moulding product into the injector 109. Furthermore, the method of manufacture comprises a solidification step E3 (implemented after the injection step E2) for solidifying the moulding product present in the cavity 105, in the injection passage 106 and in the injector 109. If the moulding product is silicone, it may be made to solidify by cross-linking it. A person skilled in the art knows how to implement the solidification step E3 that suits the moulding product used; examples will be described later. The solidified moulding product present in the cavity 105 forms the moulded component 110 comprising the plurality of lenses, this moulded component 110 being fixed to the transparent plate 104. In other words, the solidification of the moulding product in the cavity 105 leads to the creation of the connection between the moulded component 110 and the transparent plate 104, this connection thus making the moulded component 110 and the transparent plate 104 integral with each other. Thus, solidification of the moulding product present in the cavity 105 makes it possible to obtain the moulded component 110 fixed to the transparent plate 104. The solidified moulding product present in the, and where appropriate each, injection passage 106 and in the injector 109 forms the element 111 made of solidified moulding product connected to the moulded component 110. In other words, the element 111 made of solidified moulding product extends from the moulded component 110 as far as into the injector 109. Furthermore, the method of manufacture comprises a step E4 of removing the injector 109 which step is implemented after the step E3 of solidifying the moulding product. This step E4 of removing the injector 109 is performed while the transparent plate 104 is still held with respect to the moulding element 101, which results in breakage of the element 111 made of solidified moulding product. Thus, the step E4 of removing the injector 109 causes breakage of the element 111 made of solidified moulding product. After the step E4 of removing the injector 109, the method of manufacture may comprise a step E5 of demoulding the moulded component 110 by moving the transparent plate 104 away from the moulding element 101, the moulded component 110 remaining fixed to the transparent plate 104 during the demoulding of the moulded component 110 from the moulding element 101 and consecutive to the demoulding thereof: this means that the moulded component 110 can be removed without damaging it or without damaging its connection to the transparent plate 104. It will be appreciated that steps E1, E2, E3, E4, E5 are notably implemented successively.

As mentioned previously, the transparent plate 104 is intended to remain fixed to the moulded component 110. Thus, the transparent plate 104 is said to be transparent to radiation intended to pass through the lenses. The radiation is defined here as a set of electromagnetic waves, notably waves with wavelengths comprised between 300 nm and 1800 nm. Preferably, the transparent plate 104 is said to be transparent when it allows a transmission of light with an optical transmission greater than or equal to 90% over a range comprised between 300 nm and 1800 nm. For example, this range comprised between 300 nm and 1800 nm is suitable if the lenses are intended to focus light onto multi-junction photovoltaic cells. Alternatively, if the photovoltaic cells onto which the light is to be focused are based on silicon, then the range associated with optical transmission greater than or equal to 90% may correspond to the absorption range of these silicon-based photovoltaic cells, this absorption range then being comprised between 300 nm and 1200 nm. The thickness of the transparent plate 104 may be chosen according to the material of which it is fully or at least predominantly made, and according to the Young's modulus of the said material so that the transparent plate 104 has a stiffness suited to the desired optical stress requirements. In particular, the transparent plate 104 may be made of glass or based on glass, made of PMMA (the abbreviation for poly(methyl methacrylate) or based on PMMA, made of PC (the abbreviation for polycarbonate) or based on PC, made of cyclic olefin copolymer or based on cyclic olefin copolymer. Of course, other materials may enter into the composition of the transparent plate 104 provided that they allow this transparent plate 104 to perform its desired function, namely of allowing the plurality of lenses to be moulded when the transparent plate 104 is cooperating with the moulding element 101 and of allowing the transparent plate 104 to remain fixed to the plurality of lenses after the demoulding of the moulded component 110 from the moulding element 101. Preferably, the transparent plate 104 is made of glass or based on glass, this glass notably being a toughened glass. In the case of the transparent plate 104, the use of an injector 109 which is removable is a great asset notably making it possible to avoid the need to pierce the transparent plate 104 in order to inject the moulding product into the cavity. The transparent plate 104 may have a function of protecting the lenses of the plurality of lenses and this is why it remains fixed to these lenses.

The result of what has been described hereinabove is that the moulding product, once it has solidified to form the moulded component 110, is also transparent in the manner described in respect of the transparent plate 104. The solidified moulding product may then exhibit the same transparency characteristics described in respect of the transparent plate 104 with respect to the transmission of light.

It will be appreciated from the foregoing that there is a need to ensure suitable holding of the transparent plate 104 both during the introduction of moulding product into the cavity 105 and during the removal of the injector 109, the objective being for the position of the transparent plate 104 with respect to the moulding element 101, during the filling of the cavity 105 with moulding product, during the solidification of the moulding product in the cavity 105, and during the removal of the injector 109 after the moulding product present in the moulding device 100 has solidified, should remain always the same. For that, the moulding device 100 may comprise an assembly member 112 (FIGS. 1, 2, 4 and 5), also referred to as an assembly device, that fixes the position of the transparent plate 104 with respect to the moulding element 101. In particular, this assembly member 112 urges the transparent plate 104 towards a discontinuous peripheral bearing surface 113 of the face 103 of the moulding element 101 in which the indentations 102 are formed. The peripheral bearing surface 113 is said to be "discontinuous" because one or more cuts 107, formed in the moulding element 101 (notably in the face 103 thereof), which participate in the formation of the injection passage or passages 106 locally interrupt it, as do one or more slots formed in the moulding element 101 making it possible to form one or more passages 114 for expelling excess moulding product from the cavity 105. This peripheral bearing surface 113 may be formed by a peripheral rim in which the cut or cuts is or are formed, as well as the slot or slots. The face 103 comprises this peripheral rim. Worded differently, the face 103 in which the indentations 102 are formed comprises a plurality of portions, included in the same plane, these portions being intended to act as supports for example for the transparent plate 104 which is then in contact with these portions. For preference, the cut or cuts 107 intended to form the injection passage or passages 106 are situated at a first edge 115 of the moulding element 101 and the slots are situated at a second edge 116 of the moulding element 101 opposite to the first edge 115 (FIGS. 1 to 3). This particular arrangement of the cuts 107 and of the slots makes it possible to ensure a filling of the cavity 105 that is suited to the creation of lenses. The assembly member 112 may be viewed as being a collection of components collaborating with one another to hold the transparent plate 104 with respect to the moulding element 101.

According to a preferred example visible in FIGS. 1, 2, 4 and 5, the assembly member 112 comprises two frames 117, 118 between which the transparent plate 104 is arranged. The assembly member 112 also comprises at least one first fixing member 154a, 154b, 154c, 154d and at least one second fixing member 121a, 121b, 121c, 121d (FIGS. 1, 2, 4 and 5). The frames 117, 118 are assembled with one another by the said at least one first fixing member 154a, 154b, 154c, 154d in such a way as to clamp the transparent plate 104. This assembly of the two frames 117, 118 is notably such that the two frames 117, 118 are not in contact with one another, so as to ensure adequate clamping of the transparent plate 104 between them, this adequate clamping notably making it possible to fix the position of the transparent plate 104 with respect to the two frames 117, 118. Notably, several first fixing members 154a, 154b, 154c, 154d allow the two frames 117, 118 to clamp the transparent plate 104 for better distribution of the stresses applied by the frames 117, 118 to the transparent plate 104. Thus, the transparent plate 104 is framed and held with respect to the two frames 117, 118. Furthermore, the assembly of the two frames 117, 118 achieved by the said at least one first fixing member 154a, 154b, 154c, 154d clamping the transparent plate 104 is mounted to the moulding element 101 by the said at least one second fixing member 121a, 121b, 121c, 121d which results in the transparent plate 104 being held with respect to the moulding element 101. Notably, several second fixing members 121a, 121b, 121c, 121d allow the transparent plate 104 to be pressed firmly against the moulding element 101 to improve the sealing between the transparent plate 104 and the bearing surface 113 of the moulding element 101. In particular, the transparent plate 104 is positioned between the two frames 117, 118 in such a way that the two frames 117, 118 run at least partially alongside the peripheral edges 119, 120 of two opposite faces of the transparent plate 104 (see FIGS. 4 and 5). The two frames 117, 118 may each comprise at least one setback 117a, 118a forming a shoulder for the transparent plate 104 so as to ensure suitable holding of the transparent plate 104 between the two frames 117, 118. Of course, the setbacks 117a, 118a of the two frames 117, 118 are shaped giving due consideration to the thickness of the transparent plate 104, the result of this being that the two frames 117, 118 are distant from one another when they clamp the transparent plate 104. In FIGS. 1 and 2, the moulding device 100 comprises four first fixing members 154a, 154b, 154c, 154d and four second fixing members 121a, 121b, 121c, 121d, each formed by a screw. Each screw that forms a first fixing member 154a, 154b, 154c, 154d comprises a head that bears against the furthest frame 118 from the moulding element 101, and is screwed into a tapped hole formed in the nearest frame 117 to the moulding element 101. Each screw forming a corresponding second fixing member 121a, 121b, 121c, 121d comprises a head bearing against the furthest frame 118 from the moulding element 101, a body passing through the two frames 117, 118 and screwed into the moulding element 101 (notably into a corresponding tapped hole 155a, 155b formed in the moulding element 101 as visible in FIG. 3). In particular, the four second fixing members 121a, 121b, 121c, 121d are each screwed into a corresponding lateral pillar 101a, 101b, 101c, 101d (FIGS. 2, 3 4 and 5) of the moulding element 101. The lateral pillars 101a, 101b, 101c, 101d may thus act as nuts urging the assembly comprising the transparent plate 104 and the frames 117, 118 towards the moulding element 101. Thus, neither of the frames 117, 118 is in contact with the lateral pillars 101a, 101b, 101c, 101d: this allows the transparent plate 104 to be pressed, which means to say brought to bear, against the bearing surface 113. This example is preferred because it is simple to achieve and is effective for moulding the plurality of lenses. In addition, the use of frames 117, 118 for holding the transparent plate 104 during the moulding of the plurality of lenses means that a wider range of thicknesses of the transparent plate 104 can be used in as much as the frames 117, 118 allow the transparent plate 104 to be constricted in order to prevent it from deforming during the moulding of the plurality of lenses in the cavity 105.

To facilitate assembly of the moulding device 100 the latter may comprise mistake-proofing elements 156a, 156b (FIGS. 3 to 5), for example in the form of pins. These mistake-proofing pins 156a, 156b may project from the moulding element 101 and are intended to enter a corresponding hole formed in the nearest frame 117 to the moulding element 101. Alternatively, the mistake-proofing pins 156a, 156b may project from the frame 117 and may enter a corresponding hole in the moulding element 101. In addition to facilitating assembly, such mistake-proofing pins may also contribute to suitably positioning the assembly comprising the two frames 117, 118 and the transparent plate 104 with respect to the moulding element 101 in order to mould the plurality of lenses.

In order to hold the transparent plate 104 between the two frames 117, 118, the latter may comprise seals bearing against the transparent plate 104. Alternatively, if the frames 117, 118 are made of aluminium, the presence of these seals is not essential because bearing surfaces made of aluminium, belonging to the two frames 117, 118, then brought into contact with the transparent plate 104 may provide adequate retention of the transparent plate 104 with respect to the two frames 117, 118.

As illustrated by way of example in FIGS. 1 and 2, in order to ensure suitable sealing that avoids leaks of moulding product at the level of the injector 109 and more particularly, at the junction between the transparent plate 104 and the moulding element 101 where the injector 109 is mounted, the moulding device 100 comprises at least one first fixing element 122a, 122b (also visible in FIG. 3) holding the injector 109 with respect to the moulding element 101, and at least one second fixing element 123a, 123b configured to hold the injector 109 with respect to the transparent plate 104.

In other words, the injector 109 is held with respect to the moulding element 101 by at least one first fixing element 122a, 122b, and the injector 109 is held with respect to the transparent plate 104 by at least one second fixing element 123a, 123b. Notably, the moulding device 100 comprises first fixing elements 122a, 122b (for example two of these as illustrated in FIGS. 1 and 2) holding the injector 109 with respect to the moulding element 101, and second fixing elements 123a, 123b (for example two of these as illustrated in FIGS. 1 and 2) configured for holding the injector 109 with respect to the transparent plate 104. In particular, the first fixing element(s) 122a, 122b make it possible to provide the aforementioned urging between of the moulding element 101 and the injector 109. In particular, the second fixing element(s) 123a, 123b make it possible to ensure the aforementioned urging between the transparent plate 104 and the injector 109. The result of this is that the second fixing element(s) 123a, 123b are preferably configured to keep the injector 109 pressed firmly against the transparent plate 104.

According to a particular example, the or each first fixing element 122a, 122b is a screw passing through the injector 109 and screwed into the moulding element 101. More particularly, the or each first fixing element 122a, 122b is a screw comprising a head bearing against the injector 109 and comprising a body passing through the injector 109 and screwed into the moulding element 101. Furthermore, according to this particular example, the or each second fixing element 123a, 123b is a screw passing through the frames 117, 118 and screwed into the injector 109. More specifically, the or each second fixing element 123a, 123b is a screw comprising a head bearing against the frame 118 (notably against a face of this frame 118 that is oriented in an opposite direction to the moulding element 101), and comprising a body passing through the frames 117, 118 and screwed into the injector 109. Of course, in this instance, each screw may be screwed into a corresponding tapped hole formed, where appropriate, in the injector 109 or in the moulding element 101. This particular example results in suitable holding of the injector 109 ensuring suitable injection of moulding product from the injector 109 into the said at least one injection passage 106 so as to fill the cavity 105 with moulding product. After the moulding product has solidified, notably after the solidification step E3, all that is required is for the first and second fixing element(s) 122a 122b, 123a, 123b to be removed and then for a force to be applied to the injector 109 to break the element 111 made of solidified moulding product, notably at the junction between the injector 109 and the moulding element 101

The injector 109 may comprise, as illustrated by way of example in FIGS. 3 and 8 to 10, a groove 124 closed at its longitudinal ends referred to as "opposite longitudinal ends". Notably, the groove 124 comprises two lateral walls 125, 126 connected by a bottom 127 of the groove 124. The two lateral walls 125, 126 extend between the opposite longitudinal ends of the groove 124. The injector 109 preferably comprises notches 128a, 128b, 128c, 128d, each notch 128a, 128b, 128c, 128d being arranged so as to place the groove 124 in fluidic communication with one of the injection passages 106. What is meant by fluidic communication is that it is possible for a fluid, notably the moulding product, to pass from the groove 124 to each injection passage 106 via the notches 128a, 128b, 128c, 128d. Thus, the groove 124 allows the moulding product to be distributed so that it is introduced into the various notches 128a, 128b, 128c, 128d and then into the corresponding injection passages 106, and then into the cavity 105. In particular, the notches 128a, 128b, 128c, 128d connect the lateral wall 125 to a face of the injector 109 oriented towards, and preferably in contact with, the moulding element 101. In addition, the lateral walls 125, 126 of the groove 124 are connected to parts 129, 130 of the injector 109 in contact with the transparent plate 104 (with or without the interposition of seals) when the injector 109 is mounted within the moulding device 100. This particular embodiment of the injector 109 makes it possible to favour removal of the moulding product that is being solidified in the injector 109, notably after the injector 109 has been removed with respect to the moulding device 100 in order to allow reuse of the injector 109 for a future moulding of lenses. Furthermore, the injector 109 may comprise an orifice 131 connecting the groove 124 to an opposite face 132 of the injector 109 to the moulding element 101 when the injector 109 forms parts of the moulding device 100 (that is to say in the first configuration mentioned earlier). This orifice 131 may have dimensions such that cleaning it, when it contains solidified moulding product after the injector 109 has been removed with respect to the moulding device 100 is easy, again in order to allow the injector 109 to be reused. The result of the foregoing is that the groove 124 and the notches 128a, 128b, 128c, 128d cooperate with the transparent plate 104 to form a hollow injection body or duct, of closed cross section: the cavity of the hollow body is then delimited at least in part by the injector 109 and by part of a corresponding face of the transparent plate 104. Of course, the hollow injection body is a hollow body for the injection of moulding product. In particular, using such an injector 109, consecutive to the injection of moulding product, the runners 111a, 111b, 111c, 111d of solidified moulding product are formed. Each runner comprises, or is formed by, a continuity of solidified moulding product substance present in one of the injection passages 106 and in one of the corresponding notches 128a, 128b, 128c, 128d. The removal of the injector 109 results in a breakage of each of the runners at the junction between the injector 109 and the moulding element 101. In this way, the removal of the injector 109 allows controlled breakage of the runner or runners.

Figure 8:
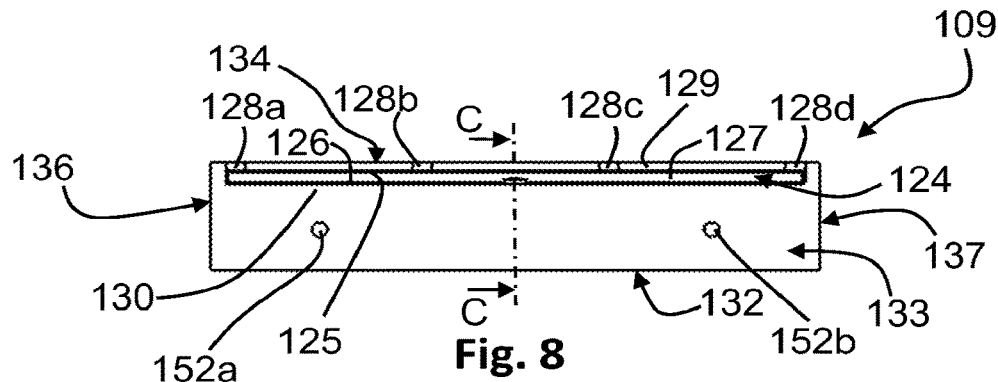
FIG. 8 illustrates a view from above of an injector of the moulding device.
Figure 9:
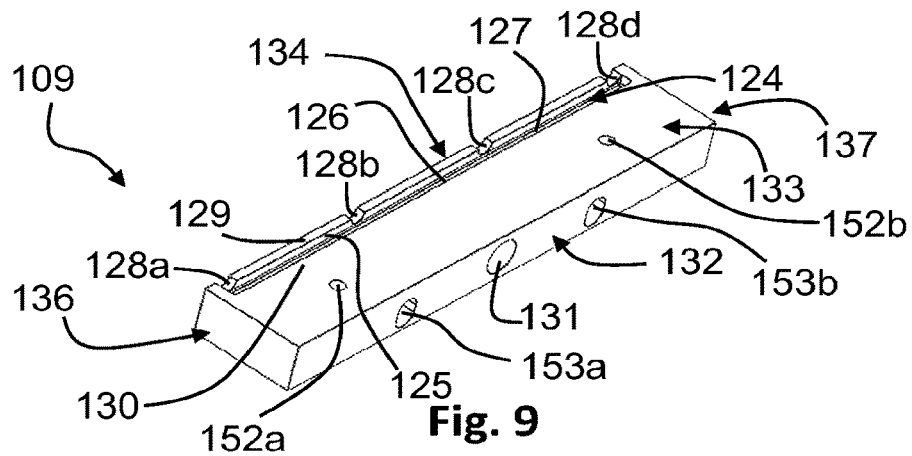
FIG. 9 illustrates a perspective view of the injector depicted in FIG. 8.
Figure 10:
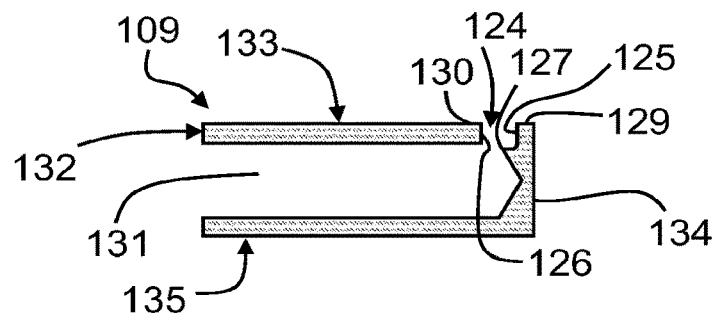
FIG. 10 schematically depicts a view in cross section along C-C of the injector of FIG. 8.

Preferably, the injector 109 may comprise first, second, third and fourth faces respectively referenced 133, 134, 135, 132 (FIGS. 8 to 10), notably all connected by two opposite end faces 136, 137. In the context of the moulding device 100 comprising the injector 109, the first face 133 of the injector 109 is oriented towards the transparent plate 104, the second face 134 is oriented towards the moulding element 101, and the third face 135, which is opposite the first face 133, is free to access. In fact, the groove 124 and the notches 128a, 128b, 128c, 128d are formed in the first face 133. Notably, the notches connect the wall 125 of the groove 124 to the second face 134. Furthermore, the orifice 131 is formed in the fourth face 132 opposite the second face 134. This orifice 131 connects the fourth face 132 to the groove 124 to allow the introduction of moulding product from the orifice 131 into the groove 124. The orifice 131 can therefore be connected to the distributor of moulding product (not depicted). Notably, the tapped holes 152a, 152b allowing the screwing-in of the second fixing elements 123a, 123b, are formed in the first face 133 of the injector 109 (FIGS. 8 and 9). Furthermore, through-holes 153a, 153b (FIG. 9) connecting the fourth face 132 of the injector 109 to the second face 134 of the injector 109 allow the first fixing elements 122a, 122b to pass. This simple form of injector 109 allows it easily to cooperate with the rest of the moulding device 100. It will therefore be appreciated that the injector 109 may adopt the overall shape of a rectangular parallelepiped, also referred to as a cuboid.

Figure 11:
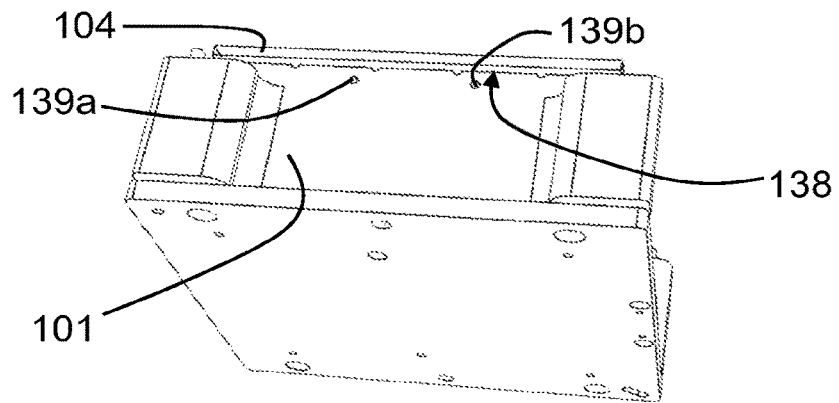
FIG. 11 illustrates a perspective view of the moulding device from which the frames and the injector have been removed in order to show a setback intended to receive the injector.

FIG. 11 illustrates a perspective view of FIG. 3, in which the injector 109 has been removed in order to show a setback 138 the preferred presence of which makes it easier to mount and remove the injector 109. Here, the moulding element 101 and the transparent plate 104 form the setback 138 where the injector 109 is arranged/mounted (notably as illustrated in FIGS. 2 and 3). Thus, this setback 138 makes it possible to form a region for mounting the injector 109. The injector 109 is mounted, when it is held with respect to the moulding element 101 and with respect to the transparent plate 104, in the mounting region. The setback 138 therefore acts as a shoulder receiving the injector 109 then mounted to the transparent plate 104 (via the frames 117, 118) and to the moulding element 101. The setback 138 is quite especially well suited to the particular shape of the injector 109 represented in FIGS. 8 to 10. FIG. 11 also shows two tapped holes 139a, 139b formed in the moulding element 101 and allowing the screwing-in of screws that form the first fixing elements 122a, 122b. When the frame 117 is in place, it may have a surface area in the continuation, or in the continuity, of that part of the setback 138 deriving from the transparent plate 104. The frame 117 may then likewise come into contact with the injector 109 in order to ensure contact between the injector 109 and the transparent plate. Alternatively, the frame 117 need not be in contact with the injector 109 at the moment that the transparent plate 104 is in contact with the injector 109.

Figure 12:
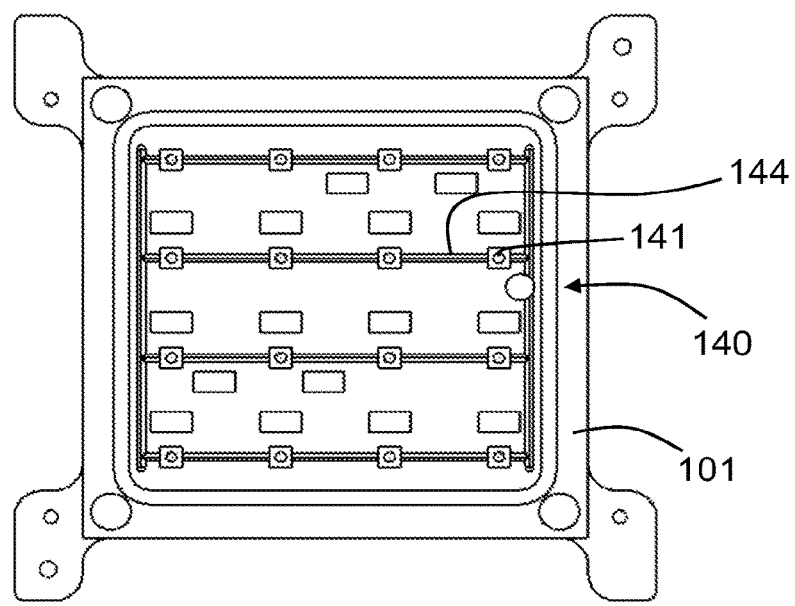
FIG. 12 illustrates a view of a moulding element of the moulding device, this view showing a face of the moulding element in which face hollows are formed.

According to an embodiment, the moulding device 100 is intended to form, by moulding, first lenses and second lenses in order to form a nonimaging optic (also referred to as an anidolic optic) for optoelectronic components. A nonimaging optic refers to optical lenses intended to manage a concentrated or diffuse light flux. In this description, an optoelectronic component may for example be a photovoltaic cell or a light emitting diode. In the case of optoelectronic components formed of photovoltaic cells, the nonimaging optic is an optical concentrator. In the case of an optical concentrator, the first lenses are referred to as primary lenses and the second lenses are referred to as secondary lenses. In the case of optoelectronic components formed by light emitting diodes, the nonimaging optic is an optical diffuser. In the case of an optical diffuser, the first lenses are referred to as secondary lenses and the second lenses are referred to as primary lenses. The nonimaging optic is said to have "two stages of lenses". In particular, according to this embodiment, the indentations 102 are intended to participate in the formation of the first lenses of the nonimaging optic. The face 103 of the moulding element 101 in which these indentations 102 are formed is a first face 103 of the moulding element 101. Moreover, the moulding element 101, as visible in FIGS. 4 and 12, comprises a second face 140, opposite to the first face 103 of the moulding element 101. The moulding element 101 comprises hollows 141 formed in its second face 140. These hollows 141 are intended to participate in the formation of the second lenses of the nonimaging optic. According to this embodiment, the moulding device 100 comprises a substrate 142 (FIG. 4) on which the optoelectronic components 143 are connected, the said substrate 142 being mounted to the moulding element 101 so that each optoelectronic component 143 is associated with one of the hollows 141 notably in such a way that each second lens is formed in contact with one of the optoelectronic components 143 as a result of the filling of the hollows 141 with moulding product. In FIG. 12, channels 144 are formed in the second face 140 of the moulding element 101 to connect the various hollows 141; all that is then required is for moulding product to be injected into one or more of the channels 144 to fill the various hollows 141. Notably, injection for filling the hollows 141 can be done through the substrate 142, and the substrate 142 may then comprise a through-hole allowing this function of injecting the moulding product to fill the hollows 141. Thus, the injection step E2 may allow the formation of the first lenses, and the method of manufacture may comprise (FIG. 7) a step E6 of injecting moulding product into the hollows 141 in order to form the second lenses. The injection step E6 may be followed, after the moulding product present in the hollows 141 has solidified, a step E7 of demoulding the secondary lenses by moving the substrate 142 away from the moulding element 101. The solidifying of the moulding product present in the hollows 141 may be achieved here simultaneously with and in the same way as during step E3. The moulding element 101 notably comprises as many hollows 141 as indentations 102, and each indentation 102 is formed in vertical alignment with a corresponding hollow 141, this making it possible to form pairs, each one comprising one of the first lenses and one of the second lenses, each pair needing to collaborate with the same radiation. The substrate 142 may be based on FR4 (which stands for "Flame Resistant 4" and corresponds to a glass fibre reinforced epoxy resin based composite) and may form a PCB ("Printed Circuit Board") comprising copper based connection tracks. Other types of suitable substrate may be used, with materials other than FR4 or copper. For example, the substrate may be of IMS ("Insulated Metal Substrate") type or of DBC ("Direct Bonded Copper") type or may contain glass or ceramic. The primary function of the substrate 142 is to electrically connect the optoelectronic components. Furthermore, the substrate 142 may also allow the greatest possible heat removal: it then acts as a heat sink. The dissipation of heat is encouraged with a substrate made of metal or of ceramic. Furthermore, the moulding device 100 may comprise a metal plate 157 (FIGS. 2 to 5), for example on which the substrate 142 is mounted using screws. This metal plate 157 may likewise comprise mistake-proofing elements 158 (one of which is visible in FIGS. 4 and 5), for example formed by pins, intended to enter holes formed in the moulding element 101 and allowing the substrate 142 to be positioned suitably with respect to the moulding element 101. This suitable positioning of the substrate 142 with respect to the moulding element 101 notably makes it possible that each second lens is formed in contact with one of the optoelectronic components 143. Alternatively, it is the moulding element 101 that may comprise the mistake-proofing elements allowing the metal plate 157 to be mounted, which plate then comprises holes into which the mistake-proofing elements can be inserted. Moreover, use may be made of screws screwed into the pillars 101a, 101b, 101c, 101d to fix the metal plate 157 to the moulding element 101 thus ensuring retention of the substrate 142 with respect to the moulding element 101.

Figure 13:
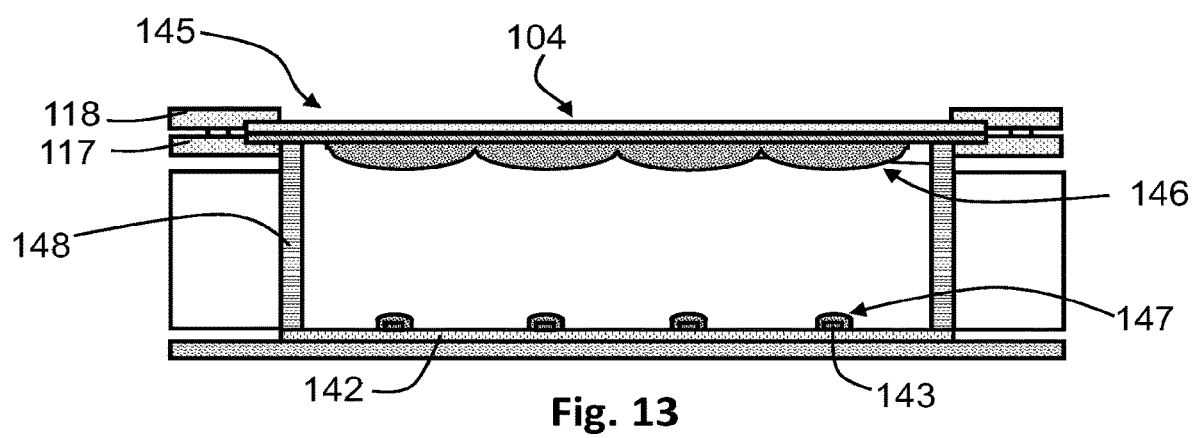
FIG. 13 illustrates a cross-sectional view of an optoelectronic device comprising a nonimaging optic obtained from a moulding of first and second lenses using the moulding device.

FIG. 13 illustrates an optoelectronic device comprising a nonimaging optic 145 with two stages of lenses comprising a stage 146 of first lenses and a stage 147 of second lenses obtained from the moulding device and/or the method of manufacture. When the nonimaging optic is an optical concentrator with two lens stages, this optoelectronic device makes it possible for example to concentrate the light flux entering the first lenses onto the corresponding photovoltaic cell 143 of the optoelectronic device while at the same time increasing the angular tolerance of the final optoelectronic device to the errors in aiming towards the sun. The use of two lens stages makes it possible more easily to tend towards the maximum theoretical concentration of light, this maximum concentration being given by the theorem of the conservation of étendu.

The advantage of moulding the first and second lenses with the aid of the same moulding element 101 is that it allows the stages 146, 147 of first and second lenses to be aligned right from the time that they are formed by moulding. The alignment of the stages 146 and 147 is notably such that pairs each comprising a first lens and a second lens which are aligned are formed. This alignment of the stages 146, 147, and therefore of the first and second lenses within a pair of first and second lenses, is defined by the moulding element 101, notably while suitably positioning the transparent plate 104 (to which the first lenses are fixed after the moulding product has solidified) with respect to the moulding element 101, and the substrate 142 (to which the second lenses are fixed after the moulding product has solidified) with respect to the moulding element 101, for example by using the mistake-proofing elements mentioned earlier. This alignment can be reproduced during the formation of the nonimaging optic 145 of the optoelectronic device after demoulding of the first and second lenses. This non-imaging optic may be formed by virtue of a framework 148 and mistake-proofing elements (not depicted in FIG. 13) of the optoelectronic device making it possible to obtain a positioning of the first lenses with respect to the second lenses that is such as that obtained at the end of the moulding of these first and second lenses. This can be achieved by repositioning the substrate 142 and the transparent plate 104 using the mistake-proofing elements for ensuring correct positioning in relation to the framework 148, in the manner in which they are positioned with respect to the moulding element 101. Thus, the positioning of the stage 146 of first lenses with respect to the stage 147 of second lenses obtained during the moulding can be reproduced during final assembly of the first lenses with the second lenses via a spacer notably forming the framework mentioned hereinabove and having the same dimensions as the moulding element 101. Final assembly of the first and second lenses makes it possible to form a nonimaging system the focal distance of which is assured by the spacer. Notably, after the demoulding of the stages 146, 147 of first and second lenses, the optoelectronic device can be obtained in the manner described in the document "Micro-Concentrator with a Self-Assembly Process" by A. Ritou et al. published in AIP Conference Proceedings 1766, 080005-1-080005-6 (2016) and from the "12th International Conference on Concentrator Photovoltaic Systems (CPV-12)".

The moulding product may be a two-part optical silicone. The use of such a silicone is known per se to those skilled in the art and not described further in detail. Any other polymer suited to the desired function of moulding lenses may also be used. In general, if a silicone is used as a moulding product, it has a refractive index corresponding to that desired for the lenses that are to be obtained by moulding. Two part silicone is then injected in the liquid state into the cavity 105 and, where appropriate, into the hollows 141, before being dried to form at least the desired moulded component 110. The drying or solidification of the moulding product in the cavity 105 may be performed at ambient temperature or in an oven at a temperature suited to accelerating the cross-linking of the silicone. In both of the drying scenarios mentioned, the geometry of the cavity 105 takes thermal deformations into consideration to guarantee the desired shape of the lenses after demoulding, which is to say after the moulded component 110 has been removed from the moulding element 101. Each of the two drying scenarios may allow implementation of the solidification step E3 described above.

When the moulding product is dry, demoulding begins with the removal of the injector 109, causing breakage of the element 111.

The moulding device 100 as described can be used to form any type of lens, for example Fresnel lenses, total internal reflection lenses for concentrating light onto photovoltaic cells, or for diffusing light emitted by light emitting diodes.

The second lenses as described may be SiLO lenses corresponding to "Single Optical surface" lenses, CPCs (which stands for "Compound Parabolic Concentrators"), Fresnel Köhler lenses or a Weierstrass sphere. SiLO can be generalized by the terms "oval Cartesian" in which the lens adopts a sort of dome shape.

In particular, within the moulding element 101, all the parts thereof that are to receive moulding product, particularly during the injection step E2, are produced with a draft: that makes it easier subsequently to demould the moulded component 110.

Preferably, the moulding product, once solidified, is transparent in the spectral range 300 nm to 1800 nm and is resistant to concentrated ultraviolet rays. This in particular allows an application in the photovoltaic field.

In general, whatever the moulding product used, it preferably has a viscosity of between 1 mPa·s and 6500 mPa·s at the moment of the filling of the cavity 105, the purpose of this being to make the moulding product flow more easily during the injection step E2.

In particular, the transparent plate 104 may, before it is transferred onto the moulding element 101, have undergone a treatment so as to favour the adhering of the moulding product thereto, notably as it polymerizes if the moulding product contains polydimethylsiloxane (PDMS). Thus, in general, the transparent plate 104 may comprise a bonding surface 149 (FIG. 4) designed to allow the moulding product solidified in the cavity 105 to adhere to the said transparent plate 104. This bonding surface may be obtained by plasma or corona treatment of the transparent plate 104: these treatments allow cleaning of the surface of the transparent plate 104 and activation of same to favour bonding of the moulding product used thereto as it solidifies. Alternatively, the bonding surface may be formed by an adhesion primer 150 (FIGS. 4 and 5) that the transparent plate 104 comprises. This adhesion primer 150 is intended to ensure (which is to say configured to allow) adhesion of the solidified moulding product present in the cavity 105 to the transparent plate 104. This adhesion primer 150 may be formed on a support 151, for example, made of glass or another material on the basis of which the transparent plate 104 is made, mentioned previously.

The adhesion primer 150 may be seen as being a layer formed on the support 151, the support 151 and the adhesion primer 150 may then form the transparent plate 104. The adhesion primer 150 is a liquid which, on drying, forms the layer mentioned hereinabove which will ensure adhesion of the moulding product to the support 151. An advantage of the use of the adhesion primer 150 is that it makes it possible to dispense with the use of a mould release agent that has to be sprayed or poured into the indentations 102 of the moulding element 101. The mould release agent has the disadvantage of leaving traces on the moulded optics, it being possible for these traces to make the optics more opaque or cause them to lose their transmission power, and this is why attempts have been made to dispense with the mould release agent. The person skilled in the art knows how to choose a moulding product suited to the transparent plate 104 to which it is to adhere, notably according to the surface treatment or adhesion primer used. Thus, more generally, the fixing of the moulded component 110 to the transparent plate 104 can be achieved by adhesion of the moulded component 110 to the transparent plate 104. The moulding product may therefore be configured to adhere to the transparent plate 104 as it solidifies.

If appropriate a surface treatment (notably as described hereinabove) or an adhesion primer (notably as described hereinabove) may also be used in combination with the substrate 142 and the optoelectronic components 143 in order to make the second lenses easier to demould.

Preferably, all the parts of the moulding element 101 that need to receive moulding product are formed with a draft, the purpose of this being on the one hand to make the lenses formed in moulding product easier to demould and, on the other hand, to make the moulding element 101 easier to reuse because the solidified moulding product will not be trapped in difficult-to-access crevices of the moulding element 101.

Furthermore, the same principle applies to the injector 109 which will be easily cleanable (even though the presence of the orifice 131 may present a problem, its length is relatively short which will make the removal of moulding product that has solidified in the orifice 131 easier).

According to an embodiment, those parts of the moulding element 101 that are to receive moulding product (for example the indentations, the hollows, the passages) may be covered with a mould release agent or have a surface formed by a nonstick layer in order to facilitate subsequent demoulding of the solidified moulding product. This nonstick layer may be made of nickel, of nickel and boron nitride, of polytetrafluoroethylene (PTFE), or of perfluorodecyltrichlorosilane (FDTS). The nonstick layer is permanent because it forms an integral part of the moulding element 101.

In general, the supplying step E1 may be preceded by an assembling of the moulding device 100, comprising fixing the transparent plate 104 to the moulding element 101, notably via the assembly member 112, fixing the injector 109 to the transparent plate 104 and to the moulding element 101 in the region forming the setback 138. If appropriate, the assembling of the moulding device 100 may also comprise mounting the substrate 142, on which the optoelectronic components 143 are connected, to the moulding element 101. After the moulding product has been injected to form the plurality of lenses and the moulding product has solidified, the moulded component 110 can be recovered after having removed the injector 109. The removal of the injector 109 can be performed by removing the first fixing element or elements 122a, 122b, and the second fixing element or elements 123a, 123b, then by applying force to the injector 109 to break the element 111 made of solidified moulding product, this resulting in a detaching of the injector 109 with respect to the moulded component 110. Next, once the injector 109 has been removed, the moulded component 110 can be demoulded by performing the moving-away step E5 mentioned hereinabove, notably after having removed the second fixing members 121a, 121b, 121c, 121d of the assembly member 112. If appropriate, after the moulding product has been injected to form the second lenses and this moulding product has solidified, the substrate 142 on which the optoelectronic components 143 are connected is moved away from the moulding element 101 so as to demould the second lenses which then remain fixed to the optoelectronic components 143. To finish, in order to obtain the result in FIG. 13, there may be formed an assembly comprising the substrate 142 bearing the optoelectronic components 143 on which the second secondary lenses are formed, and comprising the transparent plate 104 to which the first lenses are fixed.

In particular, the moulding element 101 and the injector 109 may be made of aluminium. The aluminium may be machined appropriately to form the moulding element 101 or the injector 109. The machining of the aluminium makes it possible, amongst other things, to obtain surfaces of a roughness suited to the formation of lenses.

Figure 14:
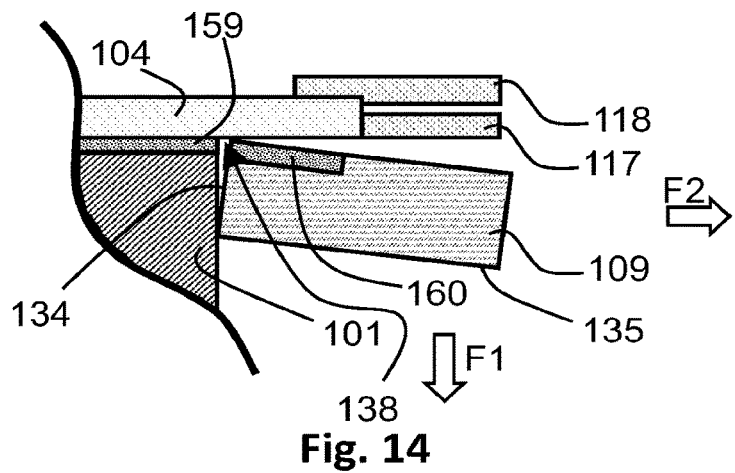
FIG. 14 is a schematic partial view in cross section along D-D of the moulding device of FIG. 1.
Figure 15:
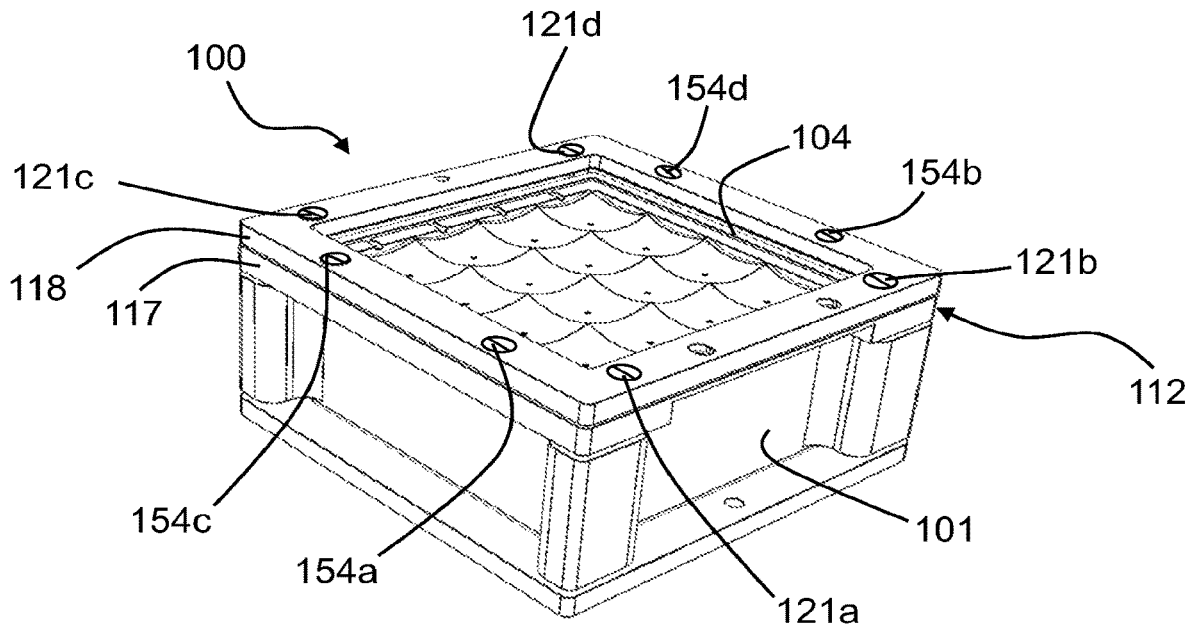
FIG. 15 is a perspective view of the moulding device for which the injector has been removed.

To make it easier to break the element 111 made of solidified moulding product, the step E4 of removing the injector 109 may comprise (FIG. 7) a step E4-1 of moving the injector 109 in an opposite direction to the moulding element 101, and notably a direction substantially parallel to a face of the transparent plate 104 oriented towards the moulding element 101. Furthermore, the removal step E4 may also comprise a step E4-2 of angling the injector 109 with respect to the face of the transparent plate 104 oriented towards the moulding element 101. Preferably, the movement step E4-1 and the angling step E4-2 are performed at least in part simultaneously, notably on account of the right parallelepiped shape of the injector 109, through a lever effect that has a tendency to generate, within the element 111 made of solidified moulding product, stresses that cause it to break. FIG. 14 schematically illustrates the removal of the injector 109 at the level of the setback 138 formed by the transparent plate 104 and the moulding element 101; parts of the moulding device that are not needed for understanding how the injector 109 is removed are not depicted in FIG. 14, for the sake of clarity. In this FIG. 14, the angling of the injector 109 (step E4-2) is done in the direction of the arrow F1, and the movement of step E4-1 in the direction of the arrow F2. In fact, angling the injector 109 makes it possible to use the lever effect which causes the movement of step E4-1. This FIG. 14 also shows two parts 159, 160 of the element made of solidified moulding product following breakage thereof. In this FIG. 14, the second face 134 of the injector 109 in contact with the moulding element 101 acts as a lever, at its corner with the third face 135 of the injector 109, against the moulding element 101, thereby resulting in a movement that has components in the direction of the arrows F1 and F2 allowing controlled breakage of the element 111 made of solidified moulding product. Furthermore, FIG. 15 depicts the moulding device 100 following removal of the injector 109, but prior to the demoulding of the moulded component, and for which the transparent plate 104 is pressed firmly against the moulding element 101 thanks to the assembly member 112 comprising the two frames 117, 118 (also visible in FIG. 14) and the first and second fixing members 154a, 154b, 154c, 154d, 121a, 121b, 121c, 121d.

In the present description, everything that applies the moulding device 100 may apply to the method of manufacture, and conversely everything that applies to the method of manufacture may apply to the moulding device 100.

The moulding device and the associated method of manufacture for lenses has an industrial application into the manufacture of lenses and, more particularly, in the context of the manufacture of nonimaging optics.

The invention claimed is:
1. A moulding device for forming lenses by moulding, said moulding device comprising:
   a moulding element comprising indentations formed in a face of the moulding element, a transparent plate held with respect to the moulding element so as to form, with the indentations, a cavity configured to allow the formation of a plurality of lenses, at least one injection passage configured to allow moulding product to be introduced into the cavity, the injection passage being arranged between the transparent plate and the moulding element, a moulding product injector arranged so as to allow moulding product to be introduced into the injection passage, wherein the injector is removable, and wherein said moulding device is configured so as to allow the injector to be removed while at the same time keeping the transparent plate held with respect to the moulding element, the moulding device further comprising an assembly member fixing the position of the transparent plate with respect to the moulding element before and after the injector is removed from the moulding device;

wherein the assembly member comprises:

at least one first fixing member, at least one second fixing member, two frames between which the transparent plate is arranged, said frames being assembled with one another by said at least one first fixing member so as to clamp the transparent plate, and the assembly of the two frames clamping the transparent plate being mounted to the moulding element by said at least one second fixing member.

2. The moulding device according to claim 1, wherein the assembly member urges the transparent plate towards a discontinuous peripheral bearing surface of the face of the moulding element wherein the indentations are formed.

3. The moulding device according to claim 1, comprising at least one first fixing element that holds the injector with respect to the moulding element, and at least one second fixing element configured to hold the injector with respect to the transparent plate.

4. The moulding device according to claim 1, comprising at least one first fixing element that holds the injector with respect to the moulding element, and at least one second fixing element configured to hold the injector with respect to the transparent plate, the first fixing element being a screw passing through the injector and screwed into the moulding element, and the second fixing element being a screw passing through the frames and screwed into the injector.

5. The moulding device according to claim 1, comprising a plurality of injection passages each forming an injection channel connecting the cavity to the injector.

6. The moulding device according to claim 5, wherein the injector comprises:

a groove closed at its longitudinal ends, and notches, each notch being arranged so as to place the groove in fluidic communication with one of the injection passages.

7. The moulding device according to claim 6, wherein the groove and the notches cooperate with the transparent plate to form a closed section hollow injection body.

8. The moulding device according to claim 1, wherein the transparent plate and the moulding element form a setback where the injector is arranged.

9. The moulding device according to claim 1, wherein:

the indentations are configured to participate in the formation of first lenses of a nonimaging optic, and the face of the moulding element wherein the indentations are formed is a first face of the moulding element, the moulding element comprises a second face opposite to its first face, the moulding element comprises hollows formed in its second face, the hollows being configured to participate in the formation of second lenses of the nonimaging optic, said moulding device comprises a substrate on which optoelectronic components are connected, said substrate being mounted to the moulding element so that each optoelectronic component is associated with one of the hollows.

10. The moulding device according to claim 1, wherein the transparent plate comprises an adhesion primer configured to allow a solidified moulding product present in the cavity to adhere to said transparent plate.

* * * * *